United States Patent [19]

Eisenberg et al.

[11] 4,107,076
[45] Aug. 15, 1978

[54] CATALYST SYSTEM FOR CATALYZING THE WATER GAS SHIFT REACTION

[75] Inventors: Richard Eisenberg; Chien-Hong Cheng, both of Rochester, N.Y.

[73] Assignee: University of Rochester, Rochester, N.Y.

[21] Appl. No.: 783,133

[22] Filed: Mar. 31, 1977

[51] Int. Cl.² .............................................. C01B 2/06
[52] U.S. Cl. ................................ 252/373; 252/429 R; 423/655; 423/656
[58] Field of Search ........................... 252/373, 429 R; 423/655, 656

[56] References Cited

U.S. PATENT DOCUMENTS

| | | | |
|---|---|---|---|
| 3,539,298 | 11/1970 | Fenton | 423/655 |
| 3,718,418 | 2/1973 | Fleming et al. | 252/373 |

*Primary Examiner*—Howard T. Mars
*Attorney, Agent, or Firm*—Martin LuKacher

[57] ABSTRACT

A method for carrying out the water gas shift reaction by use of a homogeneous catalyst system containing rhodium carbonyl iodide in a water/acetic acid solvent is described. The catalyst system can be formed from [RH (CO)₂ Cl]₂, aqueous HI and glacial acetic acid. When a reactor is charged under 250–400 torr of CO at 90° C catalysis of the water gas shift reaction results.

33 Claims, 1 Drawing Figure

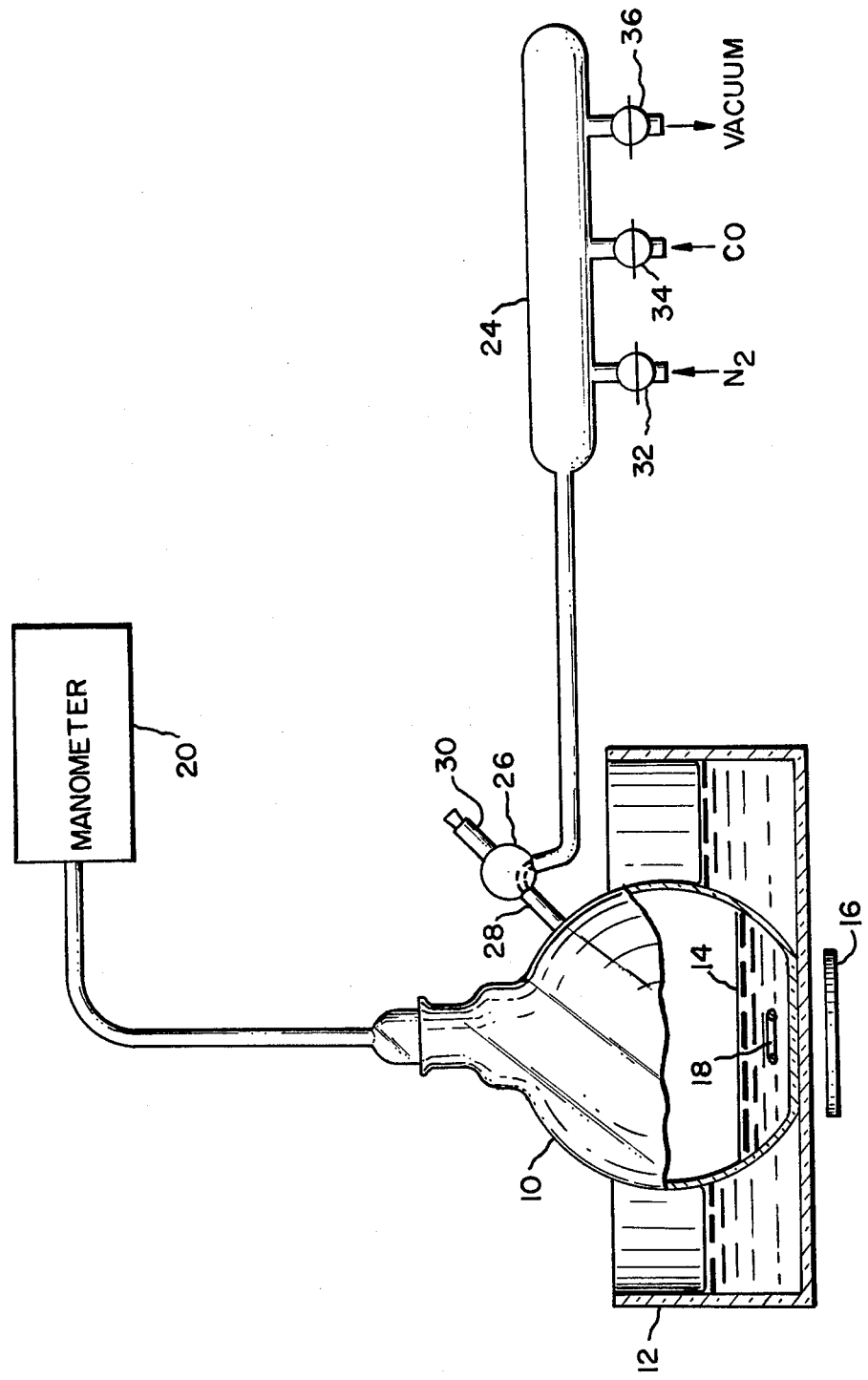

CATALYST SYSTEM FOR CATALYZING THE WATER GAS SHIFT REACTION

The present invention relates to a method of catalyzing the water gas shift reaction and particularly to an improved catalyst system for catalyzing the water gas shift reaction.

The water gas shift reaction is set forth below in Equation (1)

$$H_2O + CO \rightleftharpoons H_2 + CO_2 \qquad (1)$$

This reaction has been used commercially for many years. It is important in the preparation of ammonia synthesis gas and is used to increase the $H_2:CO$ ratio in water gas feed stock for methanation and Fischer-Tropsch synthesis. The importance of the water gas shift reaction is expected to increase with increased utilization of coal in the production of gaseous and liquid fuel and of petrochemicals. The water gas shift reaction is also a factor in the treatment of combustion exhaust in that CO and $H_2O$ are both present in these exhausts and $H_2$ is a more effective reducing agent than CO for the oxides of sulfur and nitrogen which must be eliminated from the exhaust.

The use of catalysts in promoting the water gas shift reaction has been known for many years. Iron oxides and related metal oxides have been used as catalysts. These catalysts while effective require elevated temperatures, for example iron oxide catalysts function at temperatures in excess of 350° C. Metal oxides based on copper and copper-zinc alloys operate at temperatures in the range of 200° to 250° C. Production of hydrogen via the water gas shift reaction for product formation is, however more favored at lower temperatures.

For further information respecting the water gas shift reaction and the iron and other metal oxide catalysts which have been used in promoting that reaction, reference may be had to the Catalyst Handbook, published by Springer-Verlag, New York, Inc., (1970), Chapters 5 and 6 thereof; and also to the text by H. H. Storch, et al, entitled "The Fischer-Tropsch and Related Syntheses" published by John Wiley & Sons, New York (see pages 344 to 357).

It is a feature of this invention to provide an improved catalyst system for the water gas shift reaction which is very active at relatively low temperatures and is efficient in the utilization of the components which form the catalyst system.

Various studies have been conducted on catalysts utilizing rhodium for promoting organic reaction and for the catalysis of nitric oxide reduction. Reference may be had to a publication by C. D. Meyer and R. Eisenberg, J. Amer. Chem. Soc., 98, page 1364 (1976) for further information regarding rhodium containing catalysts for nitric oxide reduction. The catalysis of an organic reaction for the conversion of methanol into acetic acid using a rhodium of carbonyl complex has also been reported (see Roth et al, Chem. Tech., page 600, October 1971; and Forster, J. Amer. Chem. Soc., Vol. 98, page 846 (1976). These catalysts have however, not been found to be active in promoting the water gas shift reaction. A noble metal using a ruthenium carbonyl complex in alkaline ethoxyethanol has been suggested for the catalysis of the water gas shift reaction, (see Laine, et al, J. Amer. Chem. Soc., Vol. 99, page 252 (1977)). However this catalyst system is not well defined, its stability is unestablished and it results in slow rates of reaction.

Accordingly, it is an object of the present invention to provide an improved homogeneous catalyst system for the water gas shift reaction which is more active than homogeneous catalyst systems which have heretofore been available.

It is another object of the present invention to provide an improved method for carrying out the water gas shift reaction with the aid of the homogeneous catalyst system which functions at temperatures lower than has been the case with catalyst systems heretofore available (e.g., less than 95° C, rather than greater than 200° C), and at which temperatures product formation is more favorable in the water gas shift reaction.

Briefly, it has been found in accordance with the invention that the water gas shift reaction is promoted in the presence of a homogeneous catalyst system formed from rhodium, iodide, a strong acid, acetic acid, and water. More particularly the catalyst system formed from rhodium carbonyl iodide, aqueous HI and acetic acid has been found to be highly active in promoting the water gas shift reaction at temperatures in the range from 80° C to 90° C. In the catalyst solution, the ratio of the iodide to rhodium is preferably in excess of 50 to 1. The preferred ratios of water to hydrogen cations have been found to be in the ranges from about 5 to 1 to about 100 to 1. The concentration of rhodium in the catalyst solution may be very low. A concentration of 0.01 molar has been found to be particularly suitable. Nevertheless, the concentration of rhodium may be increased in order to provide increased rates of product formation.

The catalytic agent in the catalyst which is active in the catalytic cycle has been found to be a rhodium (III) species (viz, rhodium in the (III) oxidation state). In this cycle the oxidation state of the rhodium catalyst may alternate between the (III) state and the (I) state.

The source of the rhodium can be a rhodium carbonyl halide complex (e.g., $[Rh(CO)_2Cl]_2$). The source of rhodium may also be $[Rh\,I_5(CO)]^{-2}X_2$, where $X_2$ is a non-interacting cation such as tetra butyl ammonium. The iodide may also be introduced into the system either as aqueous HI or as the salt of a non-interacting cation (e.g., $N_a+$, $NH_4+$, $NR_4+$ (where R is an alkyl group), $K+$, and the like)). The source of hydrogen cations may be provided by the HI which is used to introduce the iodide or from hydrochloric acid, HCl, or fluoroboric acid, $HBF_4$, for example.

The catalyst system is used in the presence of carbon monoxide which may be introduced into a reactor containing the catalyst solution. The solution is then heated with mild to moderate stirring to the temperature in the range from about 80° C to about 90° C and $H_2$ and $CO_2$ are produced while both CO and the water which is present in the solution are consumed. The solution may be recharged periodically to replace the CO consumed and such water as may have been consumed.

In the foregoing discussions and hereinafter the term homogeneous catalyst system has been used. By this term is meant a metal complex in solution which has catalytic action. A complex will also be understood to mean a compound of three or more elements.

The foregoing and other objects and advantages of the invention as well as a preferred embodiment thereof and the best mode presently known for practicing the invention are set forth in greater detail in the following description which makes reference to the accompanying drawing which is a schematic diagram of apparatus used for carrying out the water gas shift reaction in accordance with the invention.

Referring to the FIGURE, there is shown an apparatus wherein the method of catalyzing the water gas shift reaction in accordance with the presently preferred embodiment of the invention may be carried out. A reactor in the form of a flask 10 is disposed in an oil bath 12. The bath may be heated, suitably to the temperature at which the reaction is carried out. This temperature is in the range of from 80° to 90° C in the herein described examples.

The homogeneous catalyst system is shown as a volume of liquid which is deposited into the flask 10, as by pouring through a side arm (not shown) or through the mouth of the flask 10. The catalyst system is shown as the solution 14 disposed in the bottom of the flask 10. Stirring is effected, as by a magnetic stirrer arrangement, consisting of a stirrer drive 16 and a magnetic stirrer member which may be a short rod 18 disposed in the solution 14 in the flask 10. The pressure in the flask is measured by a manometer 20 connected by way of a pipe 22 to the mouth of the flask. Stoppers and supports are not shown to simplify the illustration.

To accommodate the volume of the catalyst solution and the reactant gas, CO, in the following example, the flask 10 may suitably be a one-liter flask. In the examples the volume of the solution is 50 milliliters (ml) such that the solution 14 covers the bottom of the flask 10 as shown in FIG. 1.

A manifold 24 is connected to the flask through a stopcock 26. The stopcock alternately connects the manifold to the flask by way of a side arm 28 or to a tube 30 from which samples of the product produced by the reaction ($H_2$ and $CO_2$) may be withdrawn for analysis by means of a syringe. Stopcocks 32, 34, and 36 are used to selectively admit nitrogen gas ($N_2$), carbon monoxide (CO) or to evacuate the flask by means of a vacuum pump arrangement (not shown) connected to the manifold and thence through the stopcock 26 to the flask 10.

In accordance with the presently preferred embodiment of the invention and an example thereof, the catalyst system which provides the solution 14 is prepared from the rhodium carbonyl halide complex $[Rh(CO)_2Cl]_2$, glacial acetic acid, concentrated hydrochloric acid, HCl, sodium iodide, NaI, and water. $HBF_4$ may be substituted for the concentrated HCl in accordance with another example of the catalyst system. In another example of the invention $[RhI_5(CO)]^{-2}X_2$, where X is the non-interacting cation, tetra butyl ammonium, may be used instead of $[Rh(CO)_2Cl]_2$. $[Rh(CO)_2Cl]_2$ may be prepared by techniques known in the art (see for example McCleverty et al, Inorg. Synth., Vol. 8, page 211 (1966)). Approximately 50 milliliters of the catalyst solution is placed in the flask 10. The solution is prepared by adding 97 milligrams (mg) of the rhodium carbonyl complex and 16.8 grams of NaI to a solution of 26 milliliters of glacial acetic acid, 12 milliliters of HCl and 12 milliliters of $H_2O$. Thus prepared the solution is then filtered to remove any precipitated NaCl and any undissolved NaI. The 97 mg of rhodium carbonyl complex provides 0.5 millimole of rhodium in the solution, such that the concentration of rhodium in the solution is of the order of 0.01 molar. Excess water is provided in the solution and the water serves as one of the reactants (with CO) in the water gas shift reaction. The concentrated hydrochloric acid serves as the strong acid in the catalyst system. In the above example wherein excess water is used, the ratio of water to hydrogen cations in the solution is about 100 to 1. As the reaction proceeds the ratio decreases. It has been found that a ratio of water to hydrogen cations may vary from about 5 to 1 to about 100 to 1, while the reaction is being carried out. The concentration of strong acid (HCl) in the exemplary solution is approximately 5 molar. This concentration changes as the reaction proceeds and varies from about 1 to about 5 molar. It will be appreciated that the rate of product formation is a function of the concentration of rhodium and the concentration may be increased if faster rates of formation are desired.

In this example, in the solution, the rhodium source is converted initially to the anion $[Rh(CO)_2I_2]^-$. It will be noted that the iodide is introduced into the catalyst solution in the form of a salt of iodide and a cation which is not interacting therewith, specifically NaI. It will also be noted that the strong acid is introduced into the solution as HCl. Water is also added separately. All three of these components may instead be provided by aqueous HI. However, commercial aqueous HI should be avoided because the $H_3PO_2$ preservative that it contains can lead to spurious results.

As noted above the catalyst solution prepared in accordance with the foregoing examples is placed in the reactor flask 10. The flask is flushed once with CO (viz, CO is introduced by way of the stopcocks 34 and 26). Then the stopcock 34 is closed and the stopcock 36 is opened to evacuate the CO. The reactor is then charged with CO at an initial pressure of from 250 to 400 torr as measured on the manometer 20. Approximately 50 torr of $N_2$ is then added as an internal calibrant for gas chromatographic analysis purposes. The data taken for three exemplary runs is set forth in Table I.

TABLE I

| Run | Time, hrs | Temp, (±2° C) | $CO^a$ (consumed) | $H_2^a$ | $CO_2^a$ | Cycles/day[b] |
|---|---|---|---|---|---|---|
| I | 43 | 90 | 6.4 | 7.8 | 7.7 | 8.6 |
| II | 78 | 80 | 8.7 | 8.2 | 7.9 | 5.0 |
| III[c] | 45 | 90 | 7.6 | 8.4 | 8.6 | 9.0 |

[a]in millimoles;
[b]per millimole of rhodium;
[c]recharge of run I.

Run II is conducted with the same catalyst solution, the specific ingredients of which have been set forth above (i.e., $[Rh(CO)_2Cl]_2$ (97 ml, 0.5 m mole of Rh), glacial acetic acid (26 ml), concentrated HCl(12 ml), NaI (16.8g) and $H_2O$ (12 ml)). The solution used for run III is the same as that used for run I and the flask is recharged with CO before the run commences. The solution is heated and stirred, by means of the magnetic stirrer. The solution is heated to 90 (±2)° C for run I, and 80 (±2)° C for run II. Run III is carried out at 90 (±2)° C as shown in the Table. At the end of each run the solution is cooled to ambient (room) temperature and a gas sample is withdrawn from the sampling tube 30 and analyzed. The nature of the product, $H_2$ and $CO_2$ is verified massspectrometrically and quantitative data is obtained from the gas chromatograph analysis. These data are presented in the Table.

In another run at 90 (±2)° C, the total conversion corresponded to approximately nine turnovers per day per mole of Rh with no loss of activity upon recharging. Accordingly the homogeneous catalyst system provided by the invention is the most active homogeneous catalyst system for the water gas shift reaction yet provided. It is an order of magnitude more active than the $R_u$ system reported in the above referenced article by Laine et al. The homogeneous catalyst system provided by the invention is very active at low temperatures (less than 95° C) which is advantageous since product formation by the water gas shift reaction is favored at such temperatures.

In the course of the reaction, the catalyst solution is intensely brown, which indicates the presence of a Rh(III) species, and which is catalytically active.

Several controls and experiments were performed to verify the catalytic action of the solution. These led to the following observations.

1. In the absence of $I^-$ the solution remained yellow and no products were observed;

2. The substitution of $HBF_4$ for HCl yielded a dark brown, catalytically active solution, while the omission of a strong acid produced only a trace of $CO_2$ and a yellow solution;

3. Reaction solutions with acetic acid present were 3 to 5 times more reactive than in the absence of acetic acid;

4. The use of $^{13}CO$ yielded a $CO_2$ product having the same abundance (4.15%) of $^{13}C$ label as the reactant CO (3.92%); and 5. in the absence of CO gas, the catalyst solution yielded stoichiometric amounts of $H_2$ and CO in a 1:1 ratio, followed by slow conversion of the liberated CO to $CO_2$.

Observations (1) and (2) show that the hydrogen cation (in the form $H_3O^+$) and $I^-$ are necessary for the catalysis. Observation (4) establishes that CO is the source of the product $CO_2$; thus ruling out any possible involvement of acetic acid in this regard. That acetic acid enhances the activity of the catalyst system is shown by Observation (3).

The catalyst cycle is, in accordance with the chemistry of rhodium complexes, believed to extend through the Rh(III) oxidation state and more specifically that the catalytic active species of rhodium in the cycle alternates between the Rh(I) and Rh(III) oxidation states. Thus rhodium in the rhodium complex used in the catalyst system is in the (III) oxidation state in the solution and also in the (I) oxidation state therein.

Several cycles for catalysis by the rhodium carbonyl iodide in the solution which extend through the Rh(I) and Rh(III) are believed to be operative in the catalyzing of the water gas shift solution. For example, the observed catalysis may be viewed in terms of $H_2$ formation by protonation of a Rh(I) carbonyl iodide anion followed by hydride transfer from Rh(III) to $H^+$ and $CO_2$ formation by nucleophilic attack of $H_2O$ on a Rh(III)-coordinated carbonyl followed by reductive decarboxylation.

Based upon the foregoing disclosure and examples, variations and modifications in the hereindescribed method and in the hereindescribed novel catalyst system, will undoubtedly suggest themselves to those skilled in the art. Accordingly, the foregoing description should be taken as illustrative and not in any limiting sense.

What is claimed is

1. In a method for effecting the water gas shift reaction, the improvement which comprises contacting water and carbon monoxide reactants in the presence of a homogeneous catalyst system at a temperature from about 80° C to less than 95° C, said homogeneous catalyst system being formed essentially by combining [Rh(CO)$_2$Cl]$_2$, an iodide salt of a non-interacting cation, a strong acid selected from the group consisting of HCl and HBF$_4$, water and acetic acid, the ratio of iodide to rhodium being at least 50 to 1 and the ratio of water to hydrogen cations being about 5 to 100 to 1 in said catalyst system, thereby producing hydrogen and carbon dioxide.

2. The invention as set forth in claim 1 wherein said carbon monoxide reactant is introduced to said catalyst system under pressure of from 250 to 400 torr.

3. The invention as set forth in claim 2 wherein said step of introducing said carbon monoxide reactant is carried out with an inert gas such as nitrogen.

4. The invention as set forth in claim 1 wherein rhodium in the (I) oxidation state is present in said catalyst system.

5. The invention as set forth in claim 1 wherein rhodium in the (III) oxidation state is present in said catalyst system.

6. The invention as set forth in claim 1 wherein the concentration of rhodium in said catalyst system is of the order of 0.01 molar.

7. The invention as set forth in claim 1 wherein said acetic acid is glacial acetic acid.

8. The invention as set forth in claim 1 wherein the concentration of said strong acid in said system is from 1 to 5 molar.

9. The invention as set forth in claim 1 wherein said cation is sodium and said iodide salt is NaI.

10. In a method for effecting the water gas shift reaction, the improvement which comprises contacting water and carbon monoxide reactants in the presence of a homogeneous catalyst system at a temperature from about 80° C to less than 95° C, said homogeneous catalyst system being formed essentially by combining [Rh(CO)$_2$Cl]$_2$, aqueous HI, and acetic acid, the ratio of iodide to rhodium being at least 50 to 1 and the ratio of water to hydrogen cations being about 5 to 100 to 1 in said catalyst system, thereby producing hydrogen and carbon dioxide.

11. The invention as set forth in claim 10 wherein said carbon monoxide reactant is introduced to said catalyst system under pressure of from 250 to 400 torr.

12. The invention as set forth in claim 11 wherein said step of introducing said carbon monoxide reactant is carried out with an inert gas such as nitrogen.

13. The invention as set forth in claim 10 wherein rhodium in the (I) oxidation state is present in said catalyst system.

14. The invention as set forth in claim 10 wherein rhodium in the (III) oxidation state is present in said catalyst system.

15. The invention as set forth in claim 10 wherein the concentration of rhodium in said catalyst system is of the order of 0.01 molar.

16. The invention as set forth in claim 10 wherein said acetic acid is glacial acetic acid.

17. The invention as set forth in claim 10 wherein the concentration of HI in said system is from 1 to 5 molar.

18. In a method for effecting the water gas shift reaction, the improvement which comprises contacting water and carbon monoxide reactants in the presence of a homogeneous catalyst system at a temperature from about 80° C to less than 95° C, said homogeneous catalyst system being formed essentially by combining [RhI$_5$(CO)]$^{-2}$X$_2$ where X is the non-interacting cation tetra butyl ammonium, an iodide salt of a non-interacting cation, a strong acid selected from the group consisting of HCl and HBF$_4$, water and acetic acid, the ratio of iodide to rhodium being at least 50 to 1 and the ratio of water to hydrogen cations being about 5 to 100 to 1 in said catalyst system thereby producing hydrogen and carbon dioxide.

19. The invention as set forth in claim 18 wherein said carbon monoxide reactant is introduced to said catalyst system under pressure of from 250 to 400 torr.

20. The invention as set forth in claim 19 wherein said step of introducing said carbon monoxide reactant is carried out with an inert gas such as nitrogen.

21. The invention as set forth in claim 18 wherein rhodium in the (I) oxidation state is present in said catalyst system.

22. The invention as set forth in claim 18 wherein rhodium in the (III) oxidation state is present in said catalyst system.

23. The invention as set forth in claim 18 wherein the concentration of rhodium in said catalyst system is of the order of 0.01 molar.

24. The invention as set forth in claim 18 wherein said acetic acid is glacial acetic acid.

25. The invention as set forth in claim 18 wherein the concentration of said strong acid in said system is from 1 to 5 molar.

26. The invention as set forth in claim 18 wherein said cation is sodium and said iodide salt is NaI.

27. In a method for effecting the water gas shift reaction, the improvement which comprises contacting water and carbon monoxide reactants in the presence of a homogeneous catalyst system at a temperature from about 80° C to less than 95° C, said homogeneous catalyst system being formed essentially by combining $[RhI_5(CO)]^{-2}X_2$ where X is the non-interacting cation tetra butyl ammonium, aqueous HI and acetic acid, the ratio of iodide to rhodium being at least 50 to 1 and the ratio of water to hydrogen cations being about 5 to 100 to 1 in said catalyst system, thereby producing hydrogen and carbon dioxide.

28. The invention as set forth in claim 27 wherein said carbon monoxide reactant is introduced to said catalyst system under pressure of from 250 to 400 torr.

29. The invention as set forth in claim 28 wherein said step of introducing said carbon monoxide reactant is carried out with an inert gas such as nitrogen.

30. The invention as set forth in claim 27 wherein rhodium in the (I) oxidation state is present in said catalyst system.

31. The invention as set forth in claim 27 wherein rhodium in the (III) oxidation state is present in said catalyst system.

32. The invention as set forth in claim 27 wherein said acetic acid is glacial acetic acid.

33. The invention as set forth in claim 27 wherein the concentration of HI in said system is from 1 to 5 molar.

* * * * *

UNITED STATES PATENT OFFICE
CERTIFICATE OF CORRECTION

PATENT NO. : 4,107,076
DATED : Aug. 15, 1978
INVENTOR(S) : Richard Eisenberg et al.

It is certified that error appears in the above-identified patent and that said Letters Patent are hereby corrected as shown below:

In Column 1 between the first and second paragraphs the following paragraph is inserted:

The Government has rights in this invention pursuant to Grant MPS-75-10076 awarded by the National Science Foundation.

Signed and Sealed this

Twenty-fourth Day of April 1979

[SEAL]

Attest:

RUTH C. MASON
Attesting Officer

DONALD W. BANNER
Commissioner of Patents and Trademarks